(12) United States Patent
Fang et al.

(10) Patent No.: US 8,718,382 B2
(45) Date of Patent: May 6, 2014

(54) SCALABLE PATTERN MATCHING BETWEEN A PATTERN CLIP AND A PATTERN LIBRARY

(75) Inventors: Weiping Fang, Fremont, CA (US); Jun Zhu, Fremont, CA (US); Paul C. Liu, Saratoga, CA (US); Yuli Xue, Shanghai (CN); Ke Fan, Shanghai (CN)

(73) Assignee: Synopsys, Inc., Mountain View, CA (US)

( * ) Notice: Subject to any disclaimer, the term of this patent is extended or adjusted under 35 U.S.C. 154(b) by 262 days.

(21) Appl. No.: 13/363,232

(22) Filed: Jan. 31, 2012

(65) Prior Publication Data

US 2013/0195368 A1    Aug. 1, 2013

(51) Int. Cl.
*G06K 9/64* (2006.01)

(52) U.S. Cl.
USPC .............................. 382/217; 716/106; 716/52

(58) Field of Classification Search
CPC . G06K 9/6202; G06K 9/6203; G06K 9/6204; G06K 9/6205
USPC ...................................... 382/217; 716/106, 52
See application file for complete search history.

(56) References Cited

U.S. PATENT DOCUMENTS

2009/0307642 A1 * 12/2009 Lai et al. .......................... 716/5

* cited by examiner

*Primary Examiner* — Ruiping Li
(74) *Attorney, Agent, or Firm* — Park, Vaughan, Fleming & Dowler LLP; Fang Chen (57) ABSTRACT

A two-level matching technique is described. A system can generate a set of index patterns based on a set of library patterns in a pattern library. The pattern library can include patterns that are expected to have problems during manufacturing. Next, the system can use a fast matching process to check if a first-level pattern clip potentially matches one or more index patterns from the set of index patterns. If so, the system can use a detailed matching process to match a second-level pattern clip with library patterns that correspond to the one or more index patterns. Otherwise, the system can report that the first-level pattern clip does not match any library pattern in the pattern library.

15 Claims, 11 Drawing Sheets

SCALABLE PATTERN MATCHING BETWEEN A PATTERN CLIP AND A PATTERN LIBRARY

BACKGROUND

1. Technical Field

This disclosure relates to electronic design automation (EDA). More specifically, this disclosure relates to scalable pattern-matching between library patterns and a layout of an integrated circuit (IC) chip.

2. Related Art

It is important to identify manufacturing problems in a chip layout as early as possible in the EDA flow. Some EDA flows use a pattern library for identifying manufacturing problems. A pattern library can include layout patterns that are expected to cause manufacturing problems. The system can check if one or more of the library patterns appear in the chip layout, and identify those areas of the chip layout as potential manufacturing problem areas.

As manufacturing nodes continue to shrink, capturing manufacturing problems using design rules is getting much more complicated. Identifying problem areas based on a pattern library is typically more convenient and accurate than identifying problem areas based on a set of design rules. However, when the pattern library contains a large number of patterns, the checking efficiency becomes a concern.

Conventional techniques for matching a pattern clip (e.g., a portion of a given chip layout) against a pattern library typically involves comparing each pattern in the library with the pattern clip. Unfortunately, conventional techniques for pattern matching do not scale well. If N is the number of problem locations in a target layout and M is the number of patterns in a pattern library, the computation complexity of conventional techniques is O(N×M). It is desirable to improve the efficiency of pattern matching approaches.

SUMMARY

Some embodiments described herein provide techniques and systems for performing pattern matching between a target layout and a pattern library. During operation, a system can generate a set of index patterns based on a set of library patterns in the pattern library. Next, the system can determine a first-level pattern clip based on an anchor point in the target layout. The system can then determine if the first-level pattern clip potentially matches one or more index patterns from the set of index patterns. If so, the system can determine a second-level pattern clip based on the anchor point in the target layout. Next, the system can perform a detailed matching between the second-level pattern clip and a set of library patterns that correspond to the one or more index patterns. On the other hand, if the first-level pattern clip does not match any of the index patterns in the set of index patterns, the system can determine that the first-level pattern clip does not match any library pattern in the pattern library.

In some embodiments, determining if the first-level pattern clip potentially matches one or more index patterns from the set of index patterns involves determining if a hash key corresponding to the first-level pattern clip is present in a set of hash keys (e.g., by performing a hash key table lookup) corresponding to the set of index patterns.

In some embodiments, computing a hash key for an index pattern or for a first-level pattern clip involves computing a topology hash key for the index pattern or for the first-level pattern clip, wherein the topology hash key captures topology characteristics of the associated index pattern or the associated first-level pattern clip.

In some embodiments, generating the set of index patterns based on the set of library patterns involves, for each library pattern, identifying an anchor point in the library pattern, and placing a bounding box around the anchor point to generate an index pattern based on the anchor point.

In some embodiments, identifying the set of anchor points involves identifying a set of vertices in the library pattern.

In some embodiments, identifying the anchor point involves checking if a bounding box around the anchor point fits within the library pattern. If the bounding box does not fit around the anchor point, the system can create a virtual anchor point based on the anchor point. The index pattern can then be generated by placing the bounding box around the virtual anchor point.

In some embodiments, creating the virtual anchor point based on the anchor point involves determining a set of addition points based on a set of fixed relative positions with respect to the anchor point, and selecting one of the additional points to be the virtual anchor point.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a non-transitory computer-readable storage medium, which may be any device or medium that can store code and/or data for use by a computer system. The term non-transitory computer-readable storage medium includes all computer-readable storage mediums with the sole exception of a propagating electromagnetic wave or signal. This includes, but is not limited to, volatile memory, non-volatile memory, magnetic and optical storage devices such as disk drives, magnetic tape, compact discs, DVDs (digital versatile discs or digital video discs), or other non-transitory computer-readable media now known or later developed.

Figure 1:
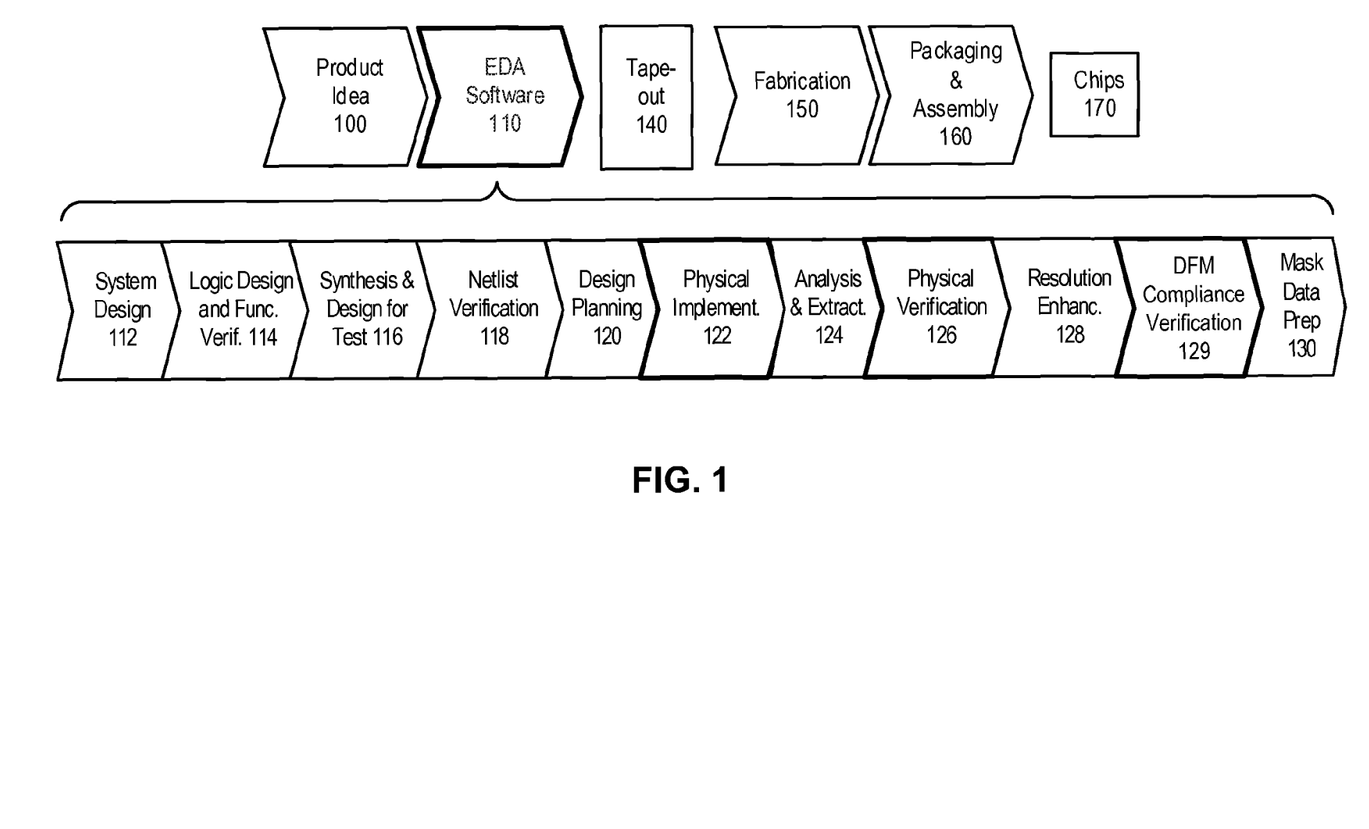
FIG. 1 illustrates various stages in the design and fabrication of an integrated circuit.

FIG. 1 illustrates various stages in the design and fabrication of an integrated circuit. The process starts with the generation of a product idea (stage 100), which is realized using an Electronic Design Automation (EDA) software design process (stage 110). When the design is finalized, it can be taped-out (stage 140). After tape-out, the fabrication process is consummated (stage 150) and packaging and assembly processes (stage 160) are performed which ultimately result in finished chips (stage 170).

The EDA software design process (stage 110), in turn, comprises stages 112-130, which are described below. Note that this design flow description is for illustration purposes only, and is not intended to limit the scope of this disclosure. For example, an actual integrated circuit design may require a designer to perform the design stages in a different sequence than the sequence described herein. The following discussion provides further details of the stages in the design process.

System design (stage 112): The designers describe the functionality to implement. They can also perform what-if planning to refine the functionality and to check costs. Hardware-software architecture partitioning can occur at this stage.

Logic design and functional verification (stage 114): At this stage, the VHDL or Verilog code for modules in the system is written and the design is checked for functional accuracy. More specifically, the design is checked to ensure that it produces the correct outputs.

Synthesis and design (stage 116): Here, the VHDL/Verilog is translated to a netlist. The netlist can be optimized for the target technology. Additionally, tests can be designed and implemented to check the finished chips.

Netlist verification (stage 118): At this stage, the netlist is checked for compliance with timing constraints and for correspondence with the VHDL/Verilog source code.

Design planning (stage 120): Here, an overall floor plan for the chip is constructed and analyzed for timing and top-level routing.

Physical implementation (stage 122): The placement (positioning of circuit elements) and routing (connection of the same) occurs at this stage.

Analysis and extraction (stage 124): At this stage, the circuit function is verified at a transistor level; this in turn permits what-if refinement.

Physical verification (stage 126): In this stage, the design is checked to ensure correctness for manufacturing, electrical issues, lithographic issues, and circuitry.

Resolution enhancement (stage 128): This stage involves geometric manipulations of the layout to improve manufacturability of the design.

DFM compliance verification (stage 129): In this stage, the design (mask layout) is checked to ensure correctness for manufacturing, electrical issues, mechanical stress issues, lithographic issues, and circuitry.

Mask data preparation (stage 130): This stage provides the "tape-out" data for production of masks to produce finished chips.

Embodiments described herein can be used during one or more of the above-described stages. Specifically, some embodiments described herein can be used during physical implementation stage 122, physical verification stage 126, and DFM compliance verification stage 129.

Some embodiments described herein provide a two-level pattern-matching technique for efficiently matching between a target layout and a library of patterns. In one embodiment, the first-level matching uses a highly scalable pattern-matching technique to quickly determine if a first-level pattern clip potentially matches a set of library patterns.

In one embodiment, the first-level pattern-matching technique uses topology hashing to facilitate efficient searching over a large number of index patterns. Note that because the first-level matching operations do not require exact and detailed matching, the operations can be very fast. Note also that after the first-level matching, those first-level pattern clips which do not match any of the library patterns are not processed any further. For a given first-level pattern clip, the set of library patterns that were identified as potential matches by the first-level matching are then used for the second-level matching stage. In one embodiment, the second-level matching involves performing detailed matching between a second-level pattern clip and a significantly reduced set of library patterns.

Figure 2:
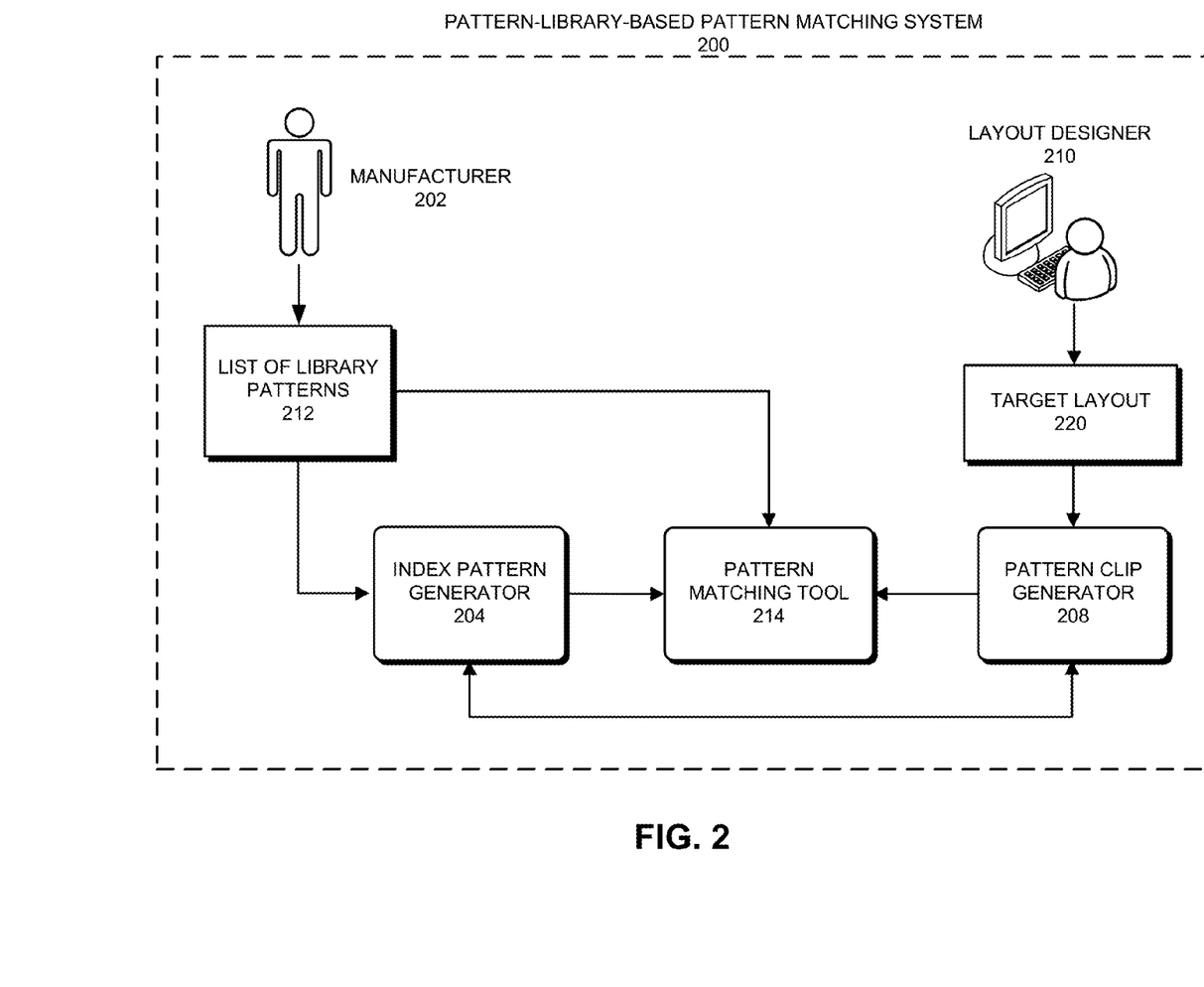
FIG. 2 presents a diagram illustrating a pattern-library-based pattern-matching system in accordance with some embodiments described herein.

FIG. 2 presents a diagram illustrating a pattern-library-based pattern-matching system 200 in accordance with some embodiments described herein.

Manufacturer 202 (or any another entity or person) can provide list of library patterns 212 which specify manufacturing problems. The list of library patterns can be manufacturer-specific if the patterns are generated for a specific manufacturing process.

As is illustrated in FIG. 2, list of library patterns 212 becomes the input to index pattern generator 204 configured to generate a set of index patterns based on the list of library patterns 212. In one embodiment, the set of index patterns are generated using a fixed-sized bounding box to facilitate a standardized pattern matching operation. We describe the operation of index pattern generator 204 in more detail below in conjunction with FIGS. 3 and 4.

Pattern clip generator 208 receives target layout 220 from layout designer 210, wherein pattern clip generator 208 is configured to generate first-level and second-level pattern clips based on target layout 220. Note that pattern clip generator 208 can communicate with index pattern generator 204. For the first-level matching, pattern clip generator 208 can generate first-level pattern clips using a bounding box that is the same size as the bounding box that was used by index pattern generator 204. For the second-level matching, pattern clip generator 208 can generate second-level pattern clips based on the library pattern sizes. We describe the operation of pattern clip generator 208 in more detail below in conjunction with FIG. 5.

Both index pattern generator 204 and pattern clip generator 208 are coupled to a pattern matching tool 214, which is configured to perform a two-level pattern matching process.

We describe the operation of pattern matching tool 214 in more detail in conjunction with FIG. 6 below.

First-Level Pattern Matching Based on Index Patterns

Figure 3:
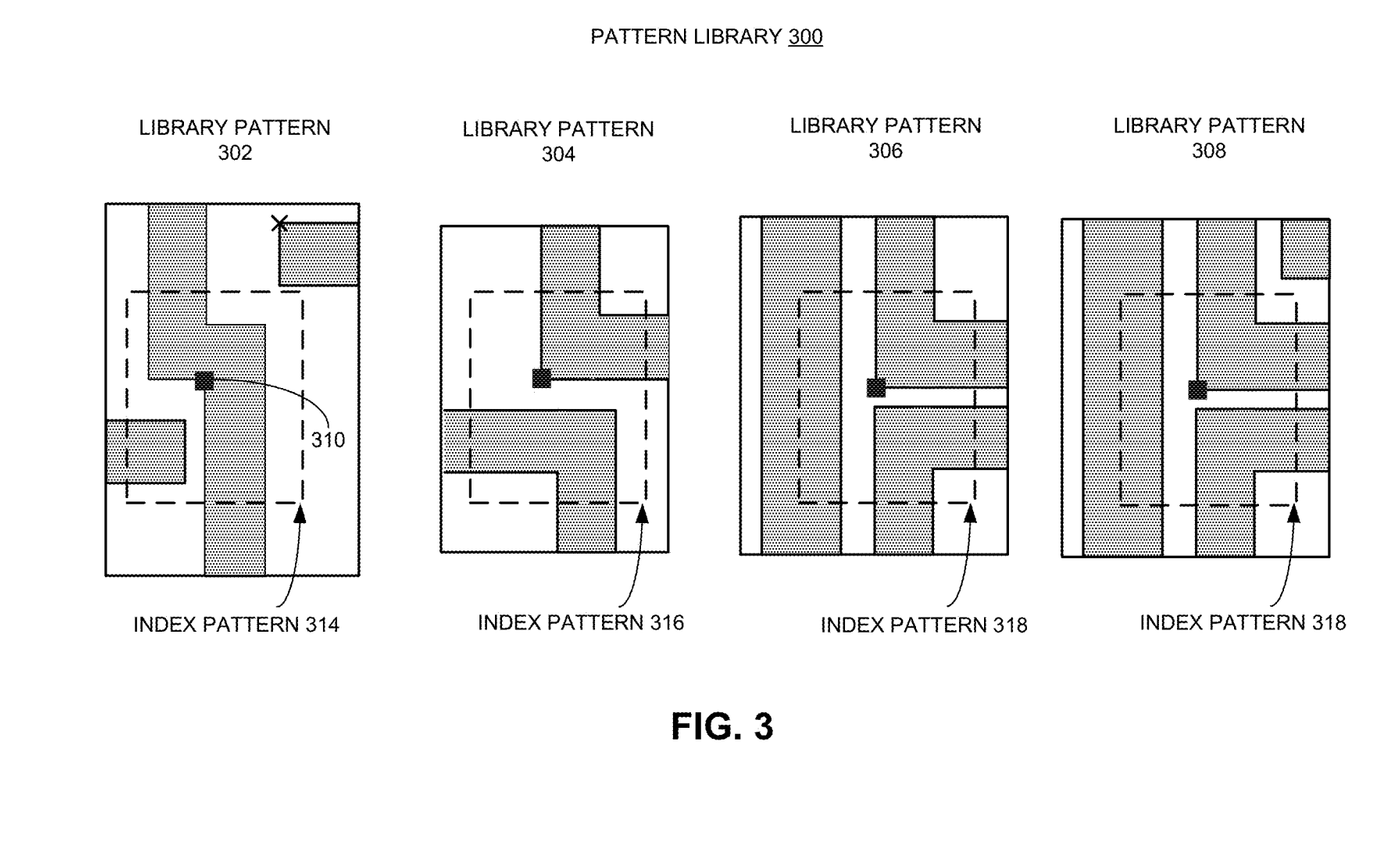
FIG. 3 illustrates a set of library patterns in a pattern library and a process for generating index patterns from the library patterns in accordance with some embodiments described herein.

FIG. 3 illustrates a set of library patterns 302-308 in a pattern library 300 and a process for generating index patterns from the library patterns in accordance with some embodiments described herein.

Note that each of the library patterns 302-308 is a unique layout configuration of a set of closely arranged polygons. Moreover, each library pattern can be a pattern that is expected to have manufacturing problems (e.g., the dimensions of the printed pattern are expected to be different from the design intent which may result in electrical open/short violations). Note also that the set of library patterns may not have the same size. For example, library pattern 302 has the largest size in pattern library 300 while library pattern 304 has the smallest size in pattern library 300.

A set of index patterns are first generated based on library patterns 302-308, and subsequently compared with the first-level pattern clips of a target layout (not shown). The embodiment of FIG. 3 illustrates the index patterns generated for each library pattern.

For example, to generate an index pattern for library pattern 302, an anchor point 310 is first identified. In general, the anchor point can be any point in the library pattern. In some embodiments, an anchor point is a corner (i.e., a polygon vertex) in a library pattern. After identifying the anchor point, a bounding box (shown with a dashed line) is placed around anchor point 310 to create an index pattern 314. Generally, an anchor point does not have to be at the actual center of the bounding box. For example, anchor point 310 is located slight higher in the upper half of bounding box 312. However, the position of the anchor point within the bounding box is constant, i.e., for generating index patterns, the bounding box is always placed in exactly the same place relative to the anchor point.

A fixed-sized bounding box is used to create index patterns, and so all index patterns are of the same size. The size of the fixed-size bounding box can be user defined or can be automatically computed by the system. While FIG. 3 illustrates a rectangular bounding box, other shapes are also possible, e.g., a hexagons or an octagon. While only pattern vertices are used as anchor points in FIG. 3, other embodiments can use a non-vertex location in a library pattern as the anchor point for generating index pattern.

In some embodiments, a set of anchor points is first identified for each library pattern. For example, all vertices within a library pattern can be identified as a set of candidate anchor points. Normally, the vertex closest to pattern center is chosen as the best anchor point, which allows the maximal index pattern size. Finally, an index pattern is generated for by placing a bounding box around the best anchor point.

When the best anchor point is located near the center of a library pattern, the corresponding index pattern fits inside the library pattern, assuming the size of the bounding box is smaller than the size of the library pattern. However, if the best anchor point is chosen near a corner or an edge of a library pattern bounding box, it may be impossible to fit the index pattern entirely within the library pattern.

Figure 4A:
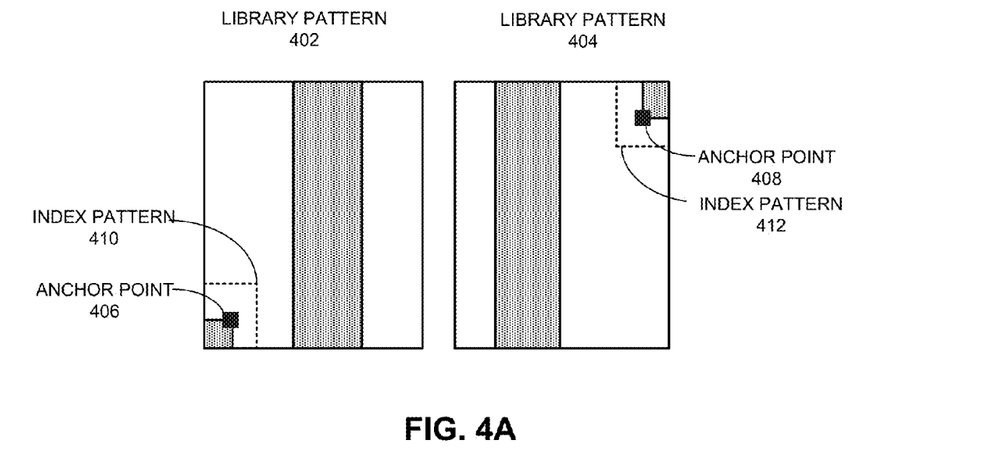
FIG. 4A illustrates two library patterns 402 and 404 which include best anchor points 406 and 408 that are located near the pattern boundaries in accordance with some embodiments described herein.

FIG. 4A illustrates two library patterns 402 and 404 which include best anchor points 406 and 408 that are located near the pattern boundaries in accordance with some embodiments described herein.

In one embodiment, if it is determined that the bounding box for the best anchor point does not fit within the library pattern, "virtual anchor points" are created based on the original anchor points. In some embodiments, a virtual anchor point can be created based on the anchor point by determining a set of addition points based on a set of fixed relative positions to the anchor point, and selecting one of the additional points to be the virtual anchor point. To distinguish anchor points based on the actual pattern vertices from virtual anchor points, we sometimes refer to the anchor points based on the actual pattern vertices as "real" anchor points.

Figure 4B:
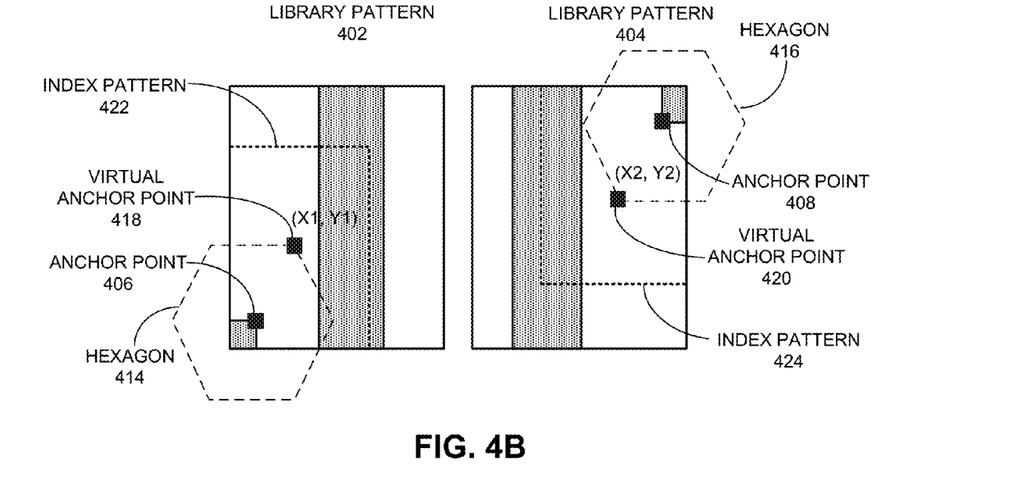
FIG. 4B illustrates a process of creating virtual anchor points based on real anchor points in accordance with some embodiments described herein.

FIG. 4B illustrates a process of creating virtual anchor points based on real anchor points in accordance with some embodiments described herein.

As illustrated in FIG. 4B, hexagons 414 and 416 with a predetermined size can be placed around respective anchor points 406 and 408. After the placement, the vertex of the hexagon which is closest to the center of the respective library pattern may be identified as the virtual anchor points 418 and 420 corresponding to real anchor points 406 and 408, respectively.

More specifically, a virtual anchor point can be determined using one of the six vertices of the placed hexagon depending on the location of the corresponding real anchor point. For example, library pattern 402 uses the upper right vertex of hexagon 414 as virtual anchor point 418 while library pattern 404 uses the lower left vertex of hexagon 416 as virtual anchor point 420. The six vertices of the hexagon represent six unique transformations from the real anchor point which is located at the center of the corresponding hexagon. For example, FIG. 4B illustrates two of the six unique transformations which can be described by their relative coordinates (X1, Y1) and (X2, Y2). Hence, all virtual anchor points created for the library patterns can be categorized into the six unique transformations. Among the six virtual anchor points, the one closest to pattern center is chosen as best anchor for the original pattern to generate index pattern.

While exemplary virtual anchor points 418 and 420 in FIG. 4B are created using hexagons placed around the real anchor points, other embodiments can use square, octagon or other deterministic transformations for generating the virtual anchor points. The anchor points need to be generated using a finite set of deterministic transformations because this finite set of deterministic transformations will be used to generate pattern clips for performing first-level matching. Specifically, while generating the index patterns, the system can keep track of the different transformations that were used for creating virtual anchor points. These transformations can then be used while generating pattern clips from the target layout. For example, if only 4 of the 6 possible transformations are used while creating the index patterns, then only those 4 transformations can be used when creating pattern clips from the target layout.

After choosing the best (real or virtual) anchor point for the library pattern, a bounding box can then be placed around the best (real or virtual) anchor point to create an index pattern. For example, FIG. 4B illustrates index patterns 422 and 424 associated with virtual anchor points 418 and 420.

Maximum index pattern size can be automatically calculated as the intersection of all library patterns represented relative to corresponding best anchor point. User specified index pattern size can be checked to ensure that it does not exceed the maximum index pattern size.

Figure 5:
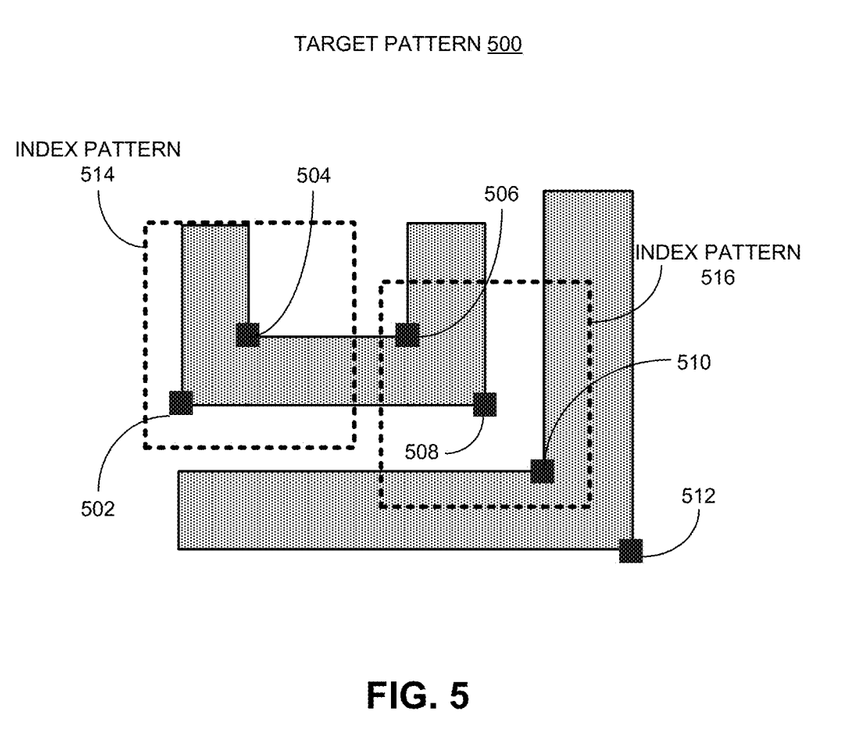
FIG. 5 illustrates a target layout and a process of creating first-level pattern clips based on the target layout in accordance with some embodiments described herein.

FIG. 5 illustrates a target layout 500 and a process of creating first-level pattern clips based on the target layout in accordance with some embodiments described herein.

Creating first-level pattern clips starts by identifying a set of anchor points. In some embodiments, a user may provide a set of anchor points. In some embodiments, each vertex in the target layout is an anchor point (such as vertices 502-512 illustrated in FIG. 5).

In one embodiment, if one or more virtual anchor points are created to generate the index patterns, virtual anchor points are also generated for a target layout. More specifically, for each identified real anchor point in the target layout, one virtual anchor point can be created for each unique transformation that was used to create a virtual anchor point while generating the index patterns. As described above, virtual anchor points generated for a pattern library can be categorized into a set of unique coordinate transformations. For example, FIG. 4B illustrates two unique virtual anchor points associated with transformations (X1, Y1) and (X2, Y2).

After creating the set of virtual anchor points, the set of real anchor points and the set of virtual anchor points are combined to generate a final set of anchor points for the target layout. Note that if no virtual anchor points were generated while creating the set of index patterns, then virtual anchor points are not generated for the target layout, and the final set of anchor points contains only the real anchor points.

Finally, a set of first-level pattern clips are generated by placing a bounding box (which is of the same size as the bounding box that was used while creating index patterns) around each of the final set of anchor points. For example, FIG. 5 illustrates two first-level pattern clips 514 and 516 generated based on anchor points 504 and 508. The position of the anchor point relative to the bounding box is also the same as it was when the index patterns were generated.

In general, one index pattern maps to k original library patterns, with k≥1 and k≤n, where n is the total number of original patterns in the library. Small average value of k is expected for typical pattern library with appropriately chosen index pattern size.

The first-level pattern matching process works on the first-level pattern clips and the index patterns. The first-level pattern matching process quickly determines if a first-level pattern clip potentially matches one or more library patterns. A first-level pattern clip "potentially matches" one or more library patterns if there is a possibility that the first-level pattern clip may match one or more library patterns upon performing a more detailed matching process. On the other hand, if the first-level pattern matching process determines that there is no possibility that the first-level pattern clip will match any of the library patterns, then the first-level pattern clip does not need to be processed any further because it is guaranteed not to match any of the library patterns. If the first-level pattern matching process determines that the first-level pattern clip potentially matches one or more index patterns, then a second-level pattern matching process needs to be performed to confirm this finding.

The first-level pattern matching process is very fast, and that is one of the reasons why the two-level pattern matching process is faster than conventional pattern matching approaches. Specifically, in some embodiments, the first-level pattern matching process can determine if a first-level pattern clip potentially matches one or more library patterns in expected constant time (e.g., with O(1) time complexity). One embodiment of the first-level pattern matching process uses hashing, which is explained below.

In the case that library patterns are exact, i.e., no edge variations are allowed along the direction perpendicular to the edge, the coordinates of index pattern vertices can be sorted in the order of x and then y. The concatenation of vertices coordinates can serve as the hash key. Hence, all index patterns can be stored in a hash table, with each hash key mapping to the corresponding original library patterns. During first-level pattern matching, hash key can be calculated in the same way from a first-level pattern clip, which can be used to lookup the hash table in expected O(1) time.

Another embodiment allows edge variations in the library patterns. FIG. 6 illustrates a topology hashing technique for generating hash keys for the set of index patterns in accordance with some embodiments described herein. This hashing based pattern matching technique is being presented for illustration purposes only and is not intended to limit the embodiments to the forms disclosed.

A polygon can be represented by a sequence of symbols (i.e., a code), wherein the sequence of symbols is determined by traversing the edges of a polygon in a clockwise or anti-clockwise direction, and representing each edge during the traversal by a unique symbol depending on the direction in which the edge is traversed. For example, without loss of generality, a vertical edge pointing up can be represented with a "1," a vertical edge pointing down can be represented with a "3," a horizontal edge pointing to the left can be represented with a "2," and a horizontal edge pointing to the right can be represented with a "0." This coding scheme is illustrated as edge coding 602.

To determine the sequence of symbols for a polygon, the edges can be traversed in a clockwise direction, starting from the leftmost edge. For example, the small rectangle at the bottom left of index pattern 604 can have the following code: 1032. An index pattern can have multiple polygons. In some embodiments, a hash value can be determined for an index pattern based on the codes for the polygons in the index pattern. For example, in one embodiment, the system can determine a hash value as follows: (1) determine a code for each polygon; (2) if there are multiple polygons with the same code, include the number of such polygons within brackets after the code (if there is only one such code, then append a "1" within brackets to the code); (3) sort the code (either lexicographically or numerically, or in any other deterministic fashion); and (4) create a hash key from the sorted list of codes.

Figure 6:
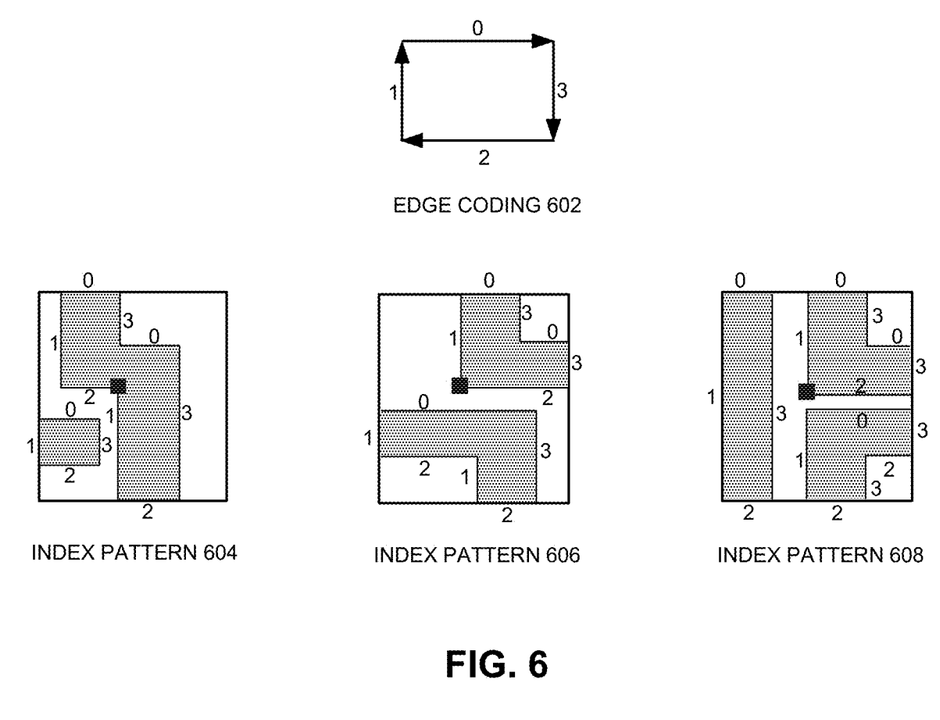
FIG. 6 illustrates index patterns which correspond to the three unique index patterns generated for pattern library in accordance with some embodiments described herein.

FIG. 6 illustrates index patterns 604-608 which correspond to the three unique index patterns 314-318 generated for pattern library 300 in accordance with some embodiments described herein. Based on the above mapping rules, index pattern 604 can be mapped to topology hash key 1032(1)-10303212(1), wherein the separator between two codes indicates these are separate polygons, and wherein the "(1)" indicates that there is only one instance of each of the two polygons. In the same manner, index pattern 606 can be mapped to topology hash key 103212(1)-103032(1); and index pattern 608 can be mapped to topology hash key 1032(1)-103032(1)-103232(1).

Note that the above-described hashing technique captures pattern topology characteristic of the polygons in the index pattern but does not capture the relative placement or the dimension information of the polygons. The hash keys can be maintained in a hash table that enables the system to determine whether a hash key is present in the hash table in expected O(1) time complexity. When new library patterns are added, corresponding hash keys can be created and added to the hash table.

In one embodiment, the same mapping rules used to map the index patterns to hash keys can be used to generate a topology hash key for a given pattern clip. Once the topology hash key for a first-level pattern clip is determined, the system can perform a hash table lookup (e.g., a hash table lookup with expected O(1) time complexity) to determine whether or not the hash key is present in the hash table. If the hash key is not present in the hash table, then the system can conclude that the first-level pattern clip does not match any of the index patterns, and therefore, does not match any of the library patterns. On the other hand, if the hash key for the first-level pattern clip exists in the hash table, then the system can perform a more detailed matching between a second-level pattern clip and the library patterns to confirm a match because, as explained above, the hash key does not encode the relative positions of the polygons in the index pattern and also does not encode the dimensions of the polygons.

Note that the above-described hashing technique is for illustration purposes only and is not intended to limit the scope of the embodiments. Other hashing techniques will be apparent to those skilled in the art.

Since the first-level matching is based on a fast hash table lookup, it is highly scalable for a pattern library with large number of patterns. Specifically, if N is the number of anchor points in the target layout (and therefore is the number of first-level pattern clips), then the first-level matching has expected O(N) time complexity if a hash table lookup technique is used that has expected O(1) time complexity. Experimental results have confirmed this by showing that the run time is insensitive to number of patterns in the library for a pattern library containing patterns of similar yet different sizes.

For a first-level pattern clip, the first-level matching identifies all index patterns that are topologically similar to the first-level pattern clip. Each index pattern that matched the library pattern in the first level matching is sometimes referred to as a "matched index pattern," and each library pattern that corresponds to a matched index pattern is sometimes referred to as a "potential match."

Second-Level Detailed Matching Based on Library Patterns

For each potential match, its bounding box relative to the anchor point is used to generate a second-level pattern clip based on an anchor point in the target layout. Some embodiments perform a detailed matching between a second-level pattern clip from a target layout and each of the potential matches. Note that any detailed pattern matching technique can be used to compare the second-level pattern clip from the target layout and the potential match.

In the case that library patterns are exact, i.e., no edge is allowed variation along the direction perpendicular to the edge, the process that was described above (e.g., the one that sorted the vertices based on their x and y coordinates, etc.) can be used to determine if there is a match between second-level pattern clip and the potentially matching library pattern.

Another detailed pattern matching technique is now described for illustrations purposes only. A library pattern can be represented as a set of polygons, wherein each polygon is represented as an edge chain. Specifically, a polygon can be represented using the following fields: (1) a selected base corner of the edge chain; (2) the topology (e.g., the polygon code that was used in the first level matching; (3) length of each edge in the edge chain, and optionally (4) the corresponding edge position tolerances. The edge position tolerances can enable fuzzy matching between a second-level pattern clip and a library pattern.

Figure 7:
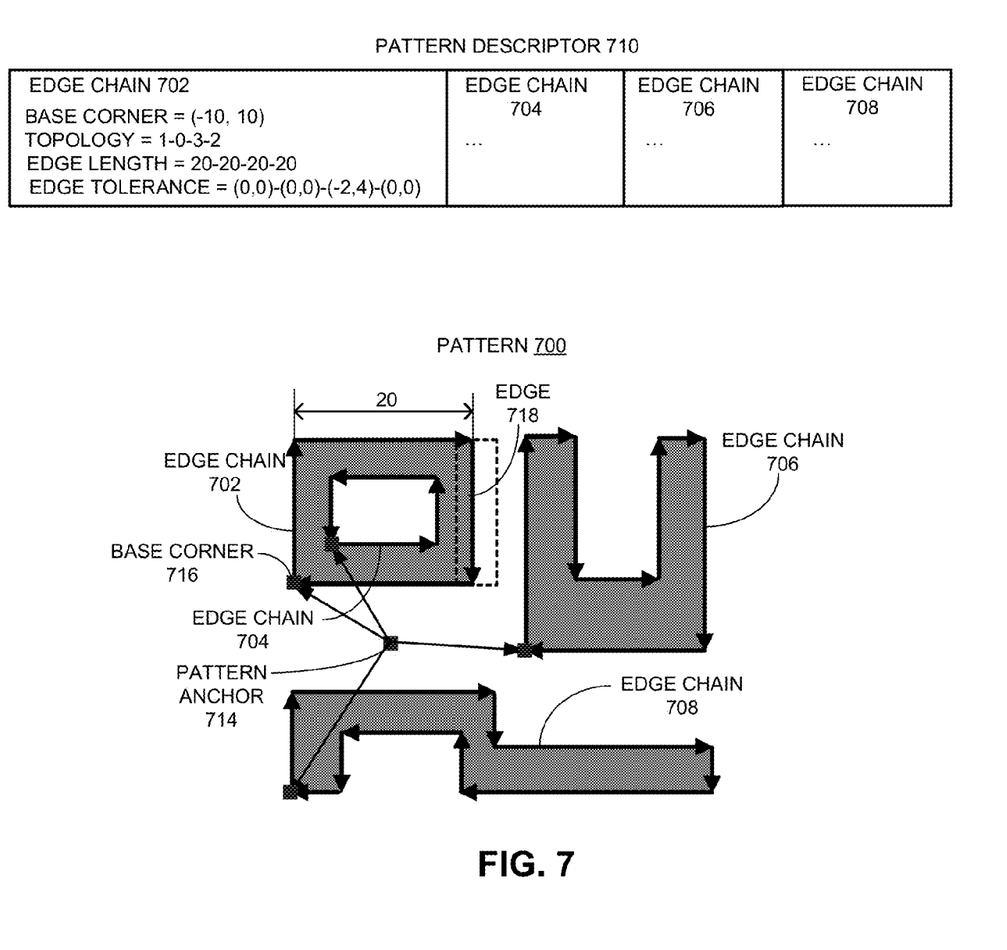
FIG. 7 illustrates a pattern description technique for describing a pattern using edge-chain-based pattern descriptors in accordance with some embodiments described herein.

FIG. 7 illustrates a pattern description technique for describing a pattern 700 using edge-chain-based pattern descriptors in accordance with some embodiments described herein. The pattern description shown in FIG. 7 is for illustration purposes only and is not intended to limit the embodiments to the form disclosed. Accordingly, many modification and variations will be apparent to those skilled in the art.

As illustrated in FIG. 7, pattern 700 can be decomposed into four edge chains. In one embodiment, edge chains that describe an outer boundary can be generated by traversing the edges in a clockwise direction, and edge chains that describe an inner boundary can be generated by traversing the edges in an anticlockwise direction (in other embodiments, a different approach can be used). For example, edge chain 702 has four edge chains linked in a clockwise direction; edge chain 704 has four edge chains linked in a counterclockwise direction (because this edge chain describes an inner boundary); edge chain 706 is has eight edge chains linked in a clockwise direction; and edge chain 708 is has ten edge chains linked in a clockwise direction. In the embodiment shown, pattern descriptor 710 for pattern 700 describes the edge chains. The pattern descriptor can be structured as follows.

<pattern_descriptor> = list of {<edge_chain>}
<edge_chain> = <base_corner><topology><edge_length>

The <base_corner> field can specify the base corner in an edge chain. For example, the bottom left vertex (e.g., the vertex with the minimum X and Y coordinates) of a polygon can be chosen as the base corner in some embodiments. The <topology> field specifies the topology of an edge chain. For example, edge coding 602 shown in FIG. 6 can be used to determine the <topology> field. For example, the following topology field value can be generated for edge chain 702: 1-0-3-2. The <edge_length> field can specify the lengths of each edge in the edge chain as they appear in the <topology field>. All four edges in edge chain 702 have the same length (20) so the <edge_length> field is 20-20-20-20, wherein the sequence of edges corresponds to the sequence of edges that were used to generate the <topology> field 1-0-3-2.

Pattern descriptor 710 for an edge chain can optionally include a tolerance field which allows fuzzy pattern matching by specifying a range. The range can be specified in absolute terms (e.g., in nm) or in relative terms (e.g., as a percentage). For example, edge chain 702 includes an edge 718 which is allowed to have a small variation to the left (up to −2 length units) and to the right (up to 4 length units). Hence, a tolerance field can be expressed as (0,0)-(0,0)-(−2,4)-(0,0), wherein the sequence of ranges correspond to the sequence of edges that were used to generate the topology field. Fields for edge chains 704, 706, and 708 can be determined in this manner.

In some embodiments, the detailed matching can be performed as follows. Determine the bounding box size of a potential match. Next, determine a second-level pattern clip that is based on the anchor point in the target layout (we know the anchor points in the target layout that returned a potential match from the first level matching) using the bounding box size of the potential match. Next, determine a pattern descriptor for the second-level pattern clip using the above-described approach. Finally, compare the pattern descriptor for the second-level pattern clip with the pattern descriptor for the library pattern as follows: (1) compare the base corner field, (2) compare the topology field, and (3) compare the edge length field taking into account any edge tolerances if they are present. If all of these three fields match, then the process can declare that the second-level pattern clip matches the library pattern.

The above-described second-level matching process is for illustration purposes only and is not intended to limit the embodiments to the forms disclosed. Many variations and modifications will be apparent to those skilled in the art. Specifically, the edge-chain based representation illustrated in FIG. 7 is just one way of representing a pattern. It will be apparent that a pattern can be represented using many other approaches, and each such approach may have a corresponding technique for performing a first-level and detailed-level match.

Pattern Matching Process

Figure 8:
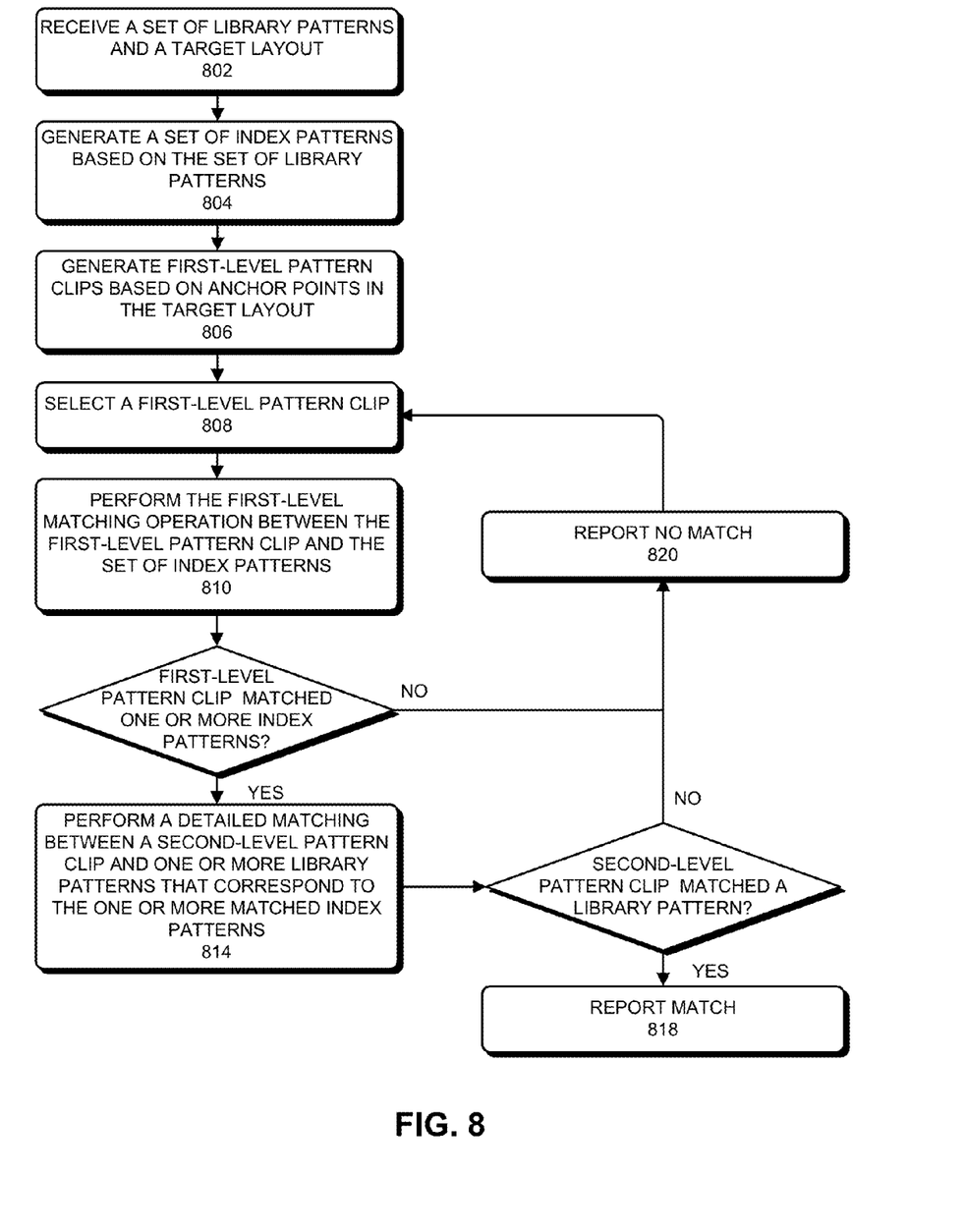
FIG. 8 presents a flowchart illustrating a process of performing pattern matching between a target layout and a pattern library in accordance with some embodiments described herein.

FIG. 8 presents a flowchart illustrating a process of performing pattern matching between a target layout and a pattern library in accordance with some embodiments described herein.

A set of library patterns and a target layout can be received (operation 802). A set of index patterns can be generated based on the set of library patterns (operation 804). Next, a set of first-level pattern clips can be generated based on anchor points in the target layout (operation 806). The process can then iteratively match each first-level pattern clip. Specifically, a first-level pattern clip can be selected (operation 808). Next, a first-level matching operation can be performed between the first-level pattern clip and the set of index patterns (operation 810). This operation can be based on computing hash value as was previously described. In general, this operation is fast and scales in terms of the number of library patterns.

If operation 808 indicates that the first-level pattern clip matched one or more index patterns, then the process can generate a second-level pattern clip from target layout and perform a detailed match between the second-level pattern clip and potential matches, i.e., one or more library patterns that correspond to the one or more matched index patterns (operation 814). If the detailed matching process indicates that the second-level pattern clip matched a library pattern, then the process can report a match (operation 818). The term "report" generally refers to providing return information (e.g., to the calling object). For example, the detailed matching process can be a method call, and "reporting a match" can correspond to the return value that is return by the method call. On the other hand, if the first-level matching indicates that the first-level pattern clip did not match any of the index patterns or if the detailed matching indicates that the second-level pattern clip did not match the identified subset of library patterns, then the process can report that at the given anchor point, there is no match for any library pattern (operation 820), and select another pattern clip (operation 808).

Figure 9:
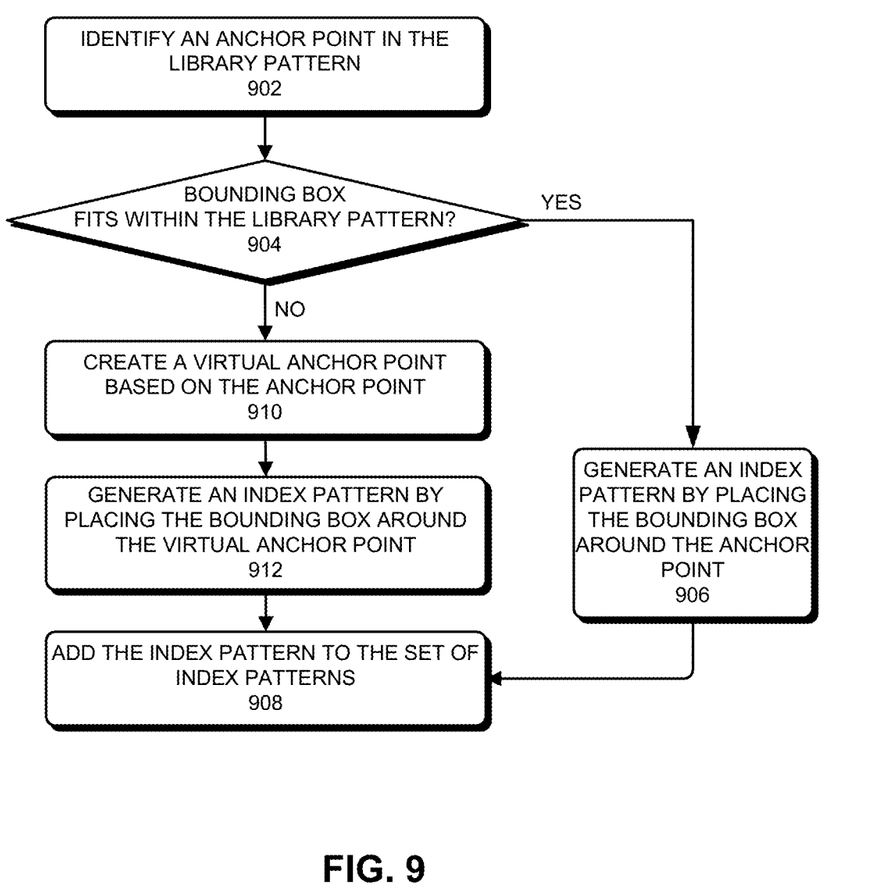
FIG. 9 presents a flowchart illustrating a process of generating one or more index patterns for a given library pattern in accordance with some embodiments described herein.

FIG. 9 presents a flowchart illustrating a process of generating one or more index patterns for a given library pattern in accordance with some embodiments described herein. Note that this process is performed for each library pattern.

During operation, the system identifies an anchor point in the library pattern (operation 902). The system then checks if the bounding box that is used for generating index patterns fits inside the library pattern when it is placed around the anchor point (operation 904). If the bounding box fits, the system generates an index pattern by placing the bounding box around the anchor point (operation 906), and adding the index pattern to the set of index patterns (operation 908). In some embodiments, instead of adding the index pattern to the set of index patterns, the system can determine a hash value for the index pattern, and add the hash value to the hash table. If the system determines that the bounding box does not fit within the library pattern, the system can create a virtual anchor point based on the anchor point (operation 910). Next, the system can generate an index pattern by placing the bounding box around the virtual anchor point (operation 912), and then adding the index pattern to the set of index patterns (operation 908). As before, in some embodiments, the system can directly generate a hash value based on the index pattern, and add the hash value to the hash table.

Figure 10:
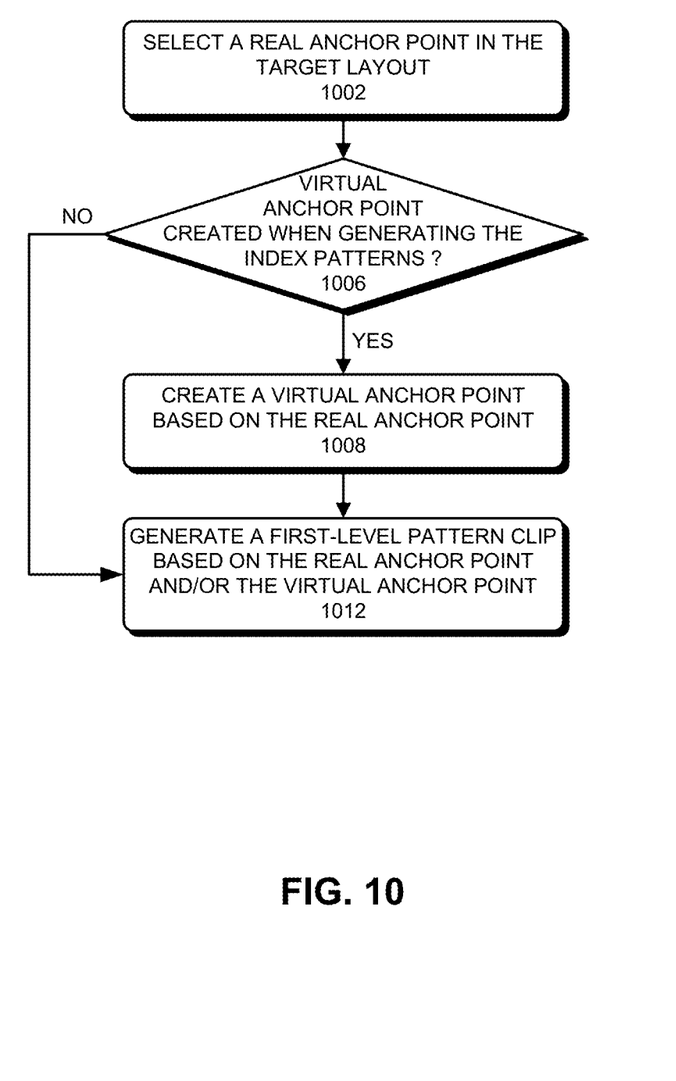
FIG. 10 presents a flowchart illustrating the process of creating a set of first-level pattern clips from the target layout for performing the first level matching in accordance with some embodiments described herein.

FIG. 10 presents a flowchart illustrating the process of creating a set of first-level pattern clips from the target layout for performing the first level matching in accordance with some embodiments described herein.

During operation, the system can select a real anchor point in the target layout (operation 1002). The system can then determine if a virtual anchor point was created when generating the set of index patterns (operation 1006). If so, the system creates a virtual anchor point based on the real anchor point (operation 1008). If no virtual anchor points were generated when the index patterns were processed, then the system skips operation 1008. Next, the system can generate a first-level pattern clip based on the real anchor point and/or the virtual anchor point (operation 1012). The first-level pattern clip is generated using the same bounding box that was used while generating the index patterns from the pattern library. These first-level pattern clips are used for performing the first-level matching. For the second level matching, the second-level pattern clip is determined using a bounding box that corresponds to a potential match.

Figure 11:
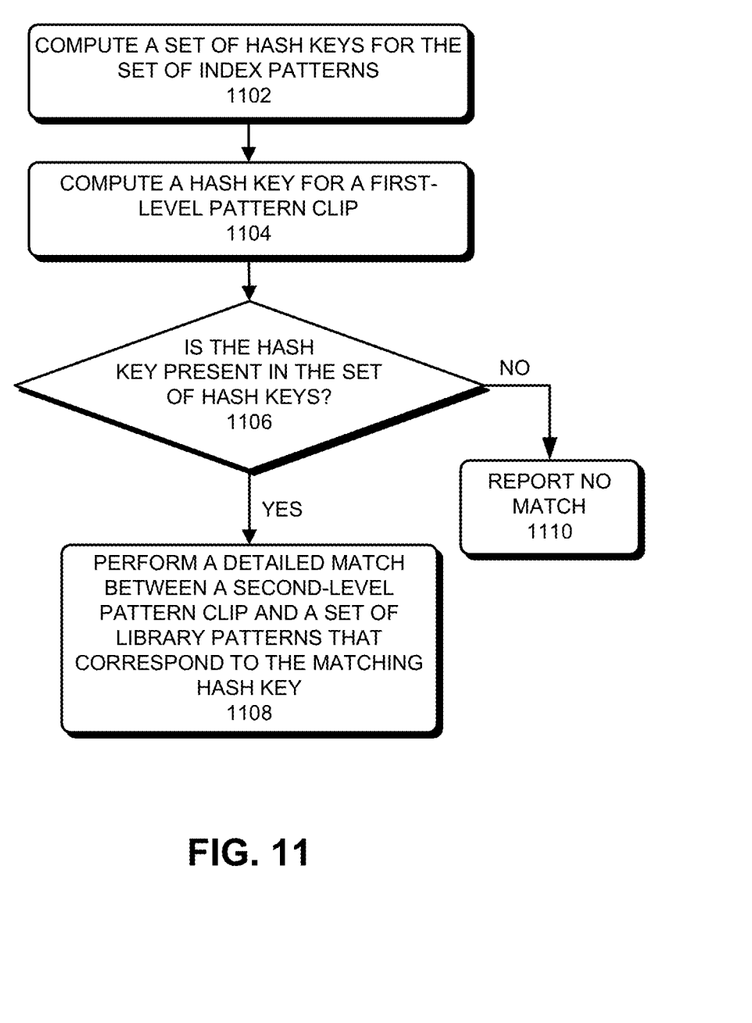
FIG. 11 presents a flowchart illustrating a process of performing the first-level matching in accordance with some embodiments described herein.

FIG. 11 presents a flowchart illustrating a process of performing the first-level matching in accordance with some embodiments described herein.

During operation, the system computes a set of hash keys for the set of index patterns (operation 1102). In one embodiment, computing a hash key for an index pattern involves computing a topology hash key for the index pattern which captures topology characteristics of the index pattern. An embodiment of generating a topology-based hash key was described previously in conjunction with FIG. 6. The hash keys are stored in a hash table that allows the system to quickly check (e.g., in expected O(1) time) whether or not a given hash key is present in the hash table.

Next, the system can compute a hash key for a first-level pattern clip (operation 1104). The system can then check if the hash key is present in the set of hash keys (operation 1106), e.g., by performing a hash table lookup. If so, the system can then determine a second-level pattern clip from the target layout and perform a detailed match between the second-level pattern clip and a set of potential matches, i.e., a set of library patterns that correspond to the matching hash key (operation 1108).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing pattern matching between a target layout and a pattern library, the method comprising:
   generating a set of index patterns based on a set of library patterns in the pattern library by, for each library pattern in a set of library patterns,
   identifying an initial anchor point,
   in response to determining that a bounding box around the initial anchor point fits within the library pattern, placing the bounding box around the initial anchor point to generate an index pattern, and
   in response to determining that the bounding box around the initial anchor point does not fit within the library pattern, creating a virtual anchor point based on the initial anchor point, and placing the bounding box around the virtual anchor point to generate the index pattern;
   determining a first-level pattern clip based on an anchor point in the target layout;

in response to determining that the first-level pattern clip potentially matches one or more index patterns from the set of index patterns,
determining a second-level pattern clip based on the anchor point in the target layout, and
performing a detailed matching between the second-level pattern clip and library patterns that correspond to the one or more index patterns; and
in response to determining that the first-level pattern clip does not match any index pattern in the set of index patterns, reporting that the first-level pattern clip does not match any library pattern in the pattern library.

2. The method of claim 1, wherein determining that the first-level pattern clip potentially matches one or more index patterns involves determining if a hash key corresponding to the first-level pattern clip is present in a set of hash keys corresponding to the set of index patterns.

3. The method of claim 2, wherein computing a hash key for an index pattern or for a first-level pattern clip involves computing a topology hash key for the index pattern or for the first-level pattern clip, wherein the topology hash key captures topology characteristics of the associated index pattern or the associated first-level pattern clip.

4. The method of claim 1, wherein identifying the anchor point involves identifying a set of vertices in the library pattern.

5. The method of claim 1, wherein creating the virtual anchor point based on the anchor point involves:
determining a set of addition points based on a set of fixed relative positions with respect to the anchor point; and
selecting an additional point from the set of additional points to be the virtual anchor point.

6. A non-transitory computer-readable storage medium storing instructions that, when executed by a computer, cause the computer to perform a method for performing pattern matching between a target layout and a pattern library, the method comprising:
generating a set of index patterns based on a set of library patterns in the pattern library by, for each library pattern in a set of library patterns,
identifying an initial anchor point,
in response to determining that a bounding box around the initial anchor point fits within the library pattern, placing the bounding box around the initial anchor point to generate an index pattern, and
in response to determining that the bounding box around the initial anchor point does not fit within the library pattern, creating a virtual anchor point based on the initial anchor point, and placing the bounding box around the virtual anchor point to generate the index pattern;
determining a first-level pattern clip based on an anchor point in the target layout;
in response to determining that the first-level pattern clip potentially matches one or more index patterns from the set of index patterns,
determining a second-level pattern clip based on the anchor point in the target layout, and
performing a detailed matching between the second-level pattern clip and library patterns that correspond to the one or more index patterns; and
in response to determining that the first-level pattern clip does not match any index pattern in the set of index patterns, reporting that the first-level pattern clip does not match any library pattern in the pattern library.

7. The non-transitory computer-readable storage medium of claim 6, wherein determining that the first-level pattern clip potentially matches one or more index patterns involves determining if a hash key corresponding to the first-level pattern clip is present in a set of hash keys corresponding to the set of index patterns.

8. The non-transitory computer-readable storage medium of claim 7, wherein computing a hash key for an index pattern or for a first-level pattern clip involves computing a topology hash key for the index pattern or for the first-level pattern clip, wherein the topology hash key captures topology characteristics of the associated index pattern or the associated first-level pattern clip.

9. The non-transitory computer-readable storage medium of claim 6, wherein identifying the set of anchor points involves identifying a set of vertices in the library pattern.

10. The non-transitory computer-readable storage medium of claim 6, wherein creating the virtual anchor point based on the anchor point involves:
determining a set of addition points based on a set of fixed relative positions with respect to the anchor point; and
selecting an additional point from the set of additional points to be the virtual anchor point.

11. A computer system, comprising:
a processor; and
non-transitory computer-readable storage medium storing instructions that, when executed by the processor, cause the computer system to perform a method, the method comprising:
generating a set of index patterns based on a set of library patterns in the pattern library by, for each library pattern in a set of library patterns,
identifying an initial anchor point,
in response to determining that a bounding box around the initial anchor point fits within the library pattern, placing the bounding box around the initial anchor point to generate an index pattern, and
in response to determining that the bounding box around the initial anchor point does not fit within the library pattern, creating a virtual anchor point based on the initial anchor point, and placing the bounding box around the virtual anchor point to generate the index pattern;
determining a first-level pattern clip based on an anchor point in the target layout;
in response to determining that the first-level pattern clip potentially matches one or more index patterns from the set of index patterns,
determining a second-level pattern clip based on the anchor point in the target layout, and
performing a detailed matching between the second-level pattern clip and library patterns that correspond to the one or more index patterns; and
in response to determining that the first-level pattern clip does not match any index pattern in the set of index patterns, reporting that the first-level pattern clip does not match any library pattern in the pattern library.

12. The computer system of claim 11, wherein determining that the first-level pattern clip potentially matches one or more index patterns involves determining if a hash key corresponding to the first-level pattern clip is present in a set of hash keys corresponding to the set of index patterns.

13. The computer system of claim 12, wherein computing a hash key for an index pattern or for a first-level pattern clip involves computing a topology hash key for the index pattern or for the first-level pattern clip, wherein the topology hash key captures topology characteristics of the associated index pattern or the associated first-level pattern clip.

14. The computer system of claim 11, wherein identifying the set of anchor points involves identifying a set of vertices in the library pattern.

15. The computer system of claim 11, wherein creating the virtual anchor point based on the anchor point involves:
   determining a set of addition points based on a set of fixed relative positions with respect to the anchor point; and
   selecting an additional point from the set of additional points to be the virtual anchor point.

* * * * *